United States Patent
Blossfeld (10) Patent No.: US 7,568,386 B2
(45) Date of Patent: Aug. 4, 2009

(54) TIRE PRESSURE MONITORING APPARATUS ALLOWING FOR RELATIVE MOVEMENT BETWEEN A PRESSURE TRANSDUCER AND A VALVE STEM

(75) Inventor: Mike Blossfeld, South Lyon, MI (US)

(73) Assignees: TRW Automotive U.S. LLC, Farmington Hills, MI (US); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/700,277

(22) Filed: Jan. 31, 2007

(65) Prior Publication Data

US 2007/0186637 A1 Aug. 16, 2007

Related U.S. Application Data

(60) Provisional application No. 60/764,556, filed on Feb. 2, 2006.

(51) Int. Cl.
*B60C 23/02* (2006.01)

(52) U.S. Cl. .................................................... 73/146.8

(58) Field of Classification Search ........ 73/146–146.8; 340/442–447
See application file for complete search history.

(56) References Cited

U.S. PATENT DOCUMENTS

| | | | |
|---|---|---|---|
| 6,160,474 A * | 12/2000 | Tsunetomi et al. | 340/442 |
| 6,163,255 A | 12/2000 | Banzhof et al. | |
| 6,568,259 B2 | 5/2003 | Saheki et al. | |
| 6,647,772 B2 * | 11/2003 | Ito et al. | 73/146 |
| 6,722,409 B1 | 4/2004 | Martin | |
| 6,774,775 B2 * | 8/2004 | Ito | 340/442 |
| 6,799,455 B1 | 10/2004 | Neefeldt et al. | |
| 6,895,810 B2 * | 5/2005 | Saheki et al. | 73/146.8 |
| 7,017,403 B2 * | 3/2006 | Normann et al. | 73/146.2 |
| 7,145,443 B2 * | 12/2006 | Ito et al. | 340/442 |
| 7,284,418 B2 * | 10/2007 | Yin et al. | 73/146.8 |
| 2002/0046599 A1 * | 4/2002 | Chuang et al. | 73/146 |
| 2003/0066343 A1 * | 4/2003 | Fischer et al. | 73/146 |
| 2004/0046649 A1 * | 3/2004 | Sanchez et al. | 340/443 |

FOREIGN PATENT DOCUMENTS

| EP | 1 386 759 A1 | 2/2004 |
|---|---|---|
| EP | 1 510 371 A1 | 3/2005 |
| EP | 1 647 422 A1 | 4/2006 |

* cited by examiner

*Primary Examiner*—Andre J Allen
*Assistant Examiner*—Jermaine Jenkins
(74) *Attorney, Agent, or Firm*—Tarolli, Sundheim, Covell & Tummino LLP (57) ABSTRACT

A tire pressure monitoring apparatus includes a pressure transducer and a valve stem. A spring member connects the pressure transducer to the valve stem. The spring member facilitates relative movement between the pressure transducer and the valve stem.

11 Claims, 8 Drawing Sheets

TIRE PRESSURE MONITORING APPARATUS ALLOWING FOR RELATIVE MOVEMENT BETWEEN A PRESSURE TRANSDUCER AND A VALVE STEM

RELATED APPLICATION

This application claims priority from U.S. provisional patent application Ser. No. 60/764,556, filed on Feb. 2, 2006, the subject matter of which is incorporated herein by reference.

TECHNICAL FIELD

The present invention relates to a tire pressure monitoring apparatus and, in particular, relates to a unitized tire pressure monitoring apparatus with features that facilitate installation on various vehicle wheel configurations.

BACKGROUND OF THE INVENTION

Tire pressure monitoring ("TPM") systems are known in the art. There have been several mounting arrangements proposed for these TPM systems and apparatuses. Some of the proposed mounting arrangements are shown in U.S. Pat. No. 6,163,255, No. 6,722,409, No. 6,568,259, and No. 6,799,455.

The automotive industry is driving to reduce the number of part numbers used for vehicle assembly. The industry is also attempting to reduce labor in plants and cost from suppliers for purchased assemblies. TPM sensors are rapidly becoming a commodity, and OEMs are attempting to use one part for multiple platform applications with simplified assembly while maintaining current assembly processes. The challenge for the TPM sensor is providing a single TPM sensor configuration that is capable of being mounted rigidly to a wide range of wheel rim thicknesses and configurations, while maintaining the current "snap-in" valve design and continued sealing performance over high speeds.

SUMMARY OF THE INVENTION

In accordance with the present invention, a unitized tire pressure monitoring system facilitates installation on various vehicle wheel configurations. In one aspect, the present invention relates to a tire pressure monitoring apparatus that includes a pressure transducer and a valve stem. A spring member connects the pressure transducer to the valve stem. The spring member facilitates relative movement between the pressure transducer and the valve stem.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Referring to FIGS. 1-4, according to a first embodiment of the present invention, a tire pressure monitoring ("TPM") apparatus or sensor 10 includes a valve stem 12 and a pressure transducer 14 with a housing 16. The TPM sensor 10 is configured to be mounted on a vehicle wheel 50 (FIGS. 2-4) in a manner described in further detail below. The valve stem 12 includes a valve mechanism (not shown) that allows for selectively inflating or deflating a tire (not shown) mounted on the wheel 50, as known in the art. The pressure transducer 14 is operative to sense the inflation pressure of the tire and provide a signal, indicative of the sensed pressure, to a vehicle mounted apparatus (not shown), such as a controller.

Figure 1:
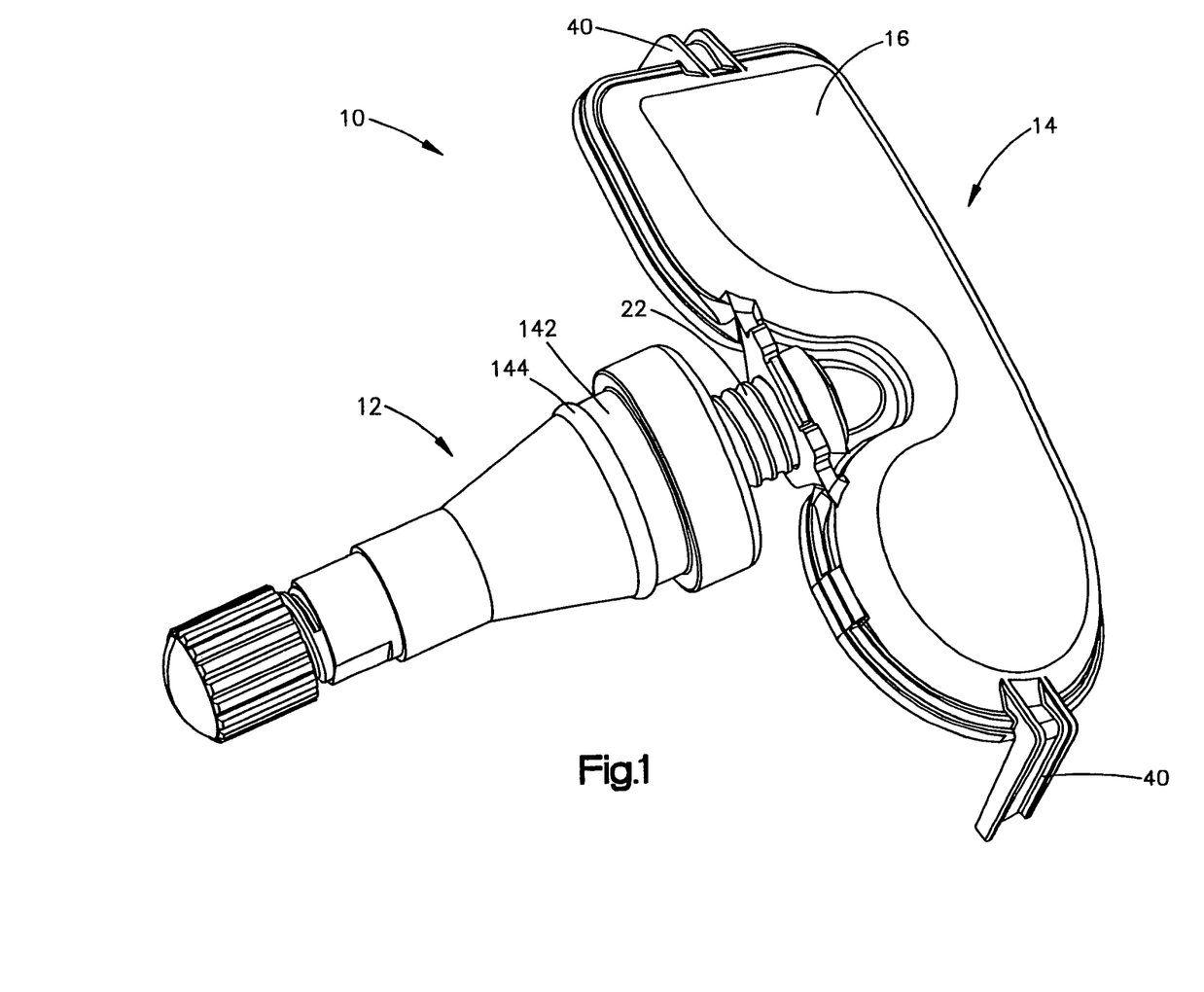
FIG. 1 is a perspective view of a tire pressure monitoring apparatus in accordance with a first embodiment of the present invention.
Figure 2:
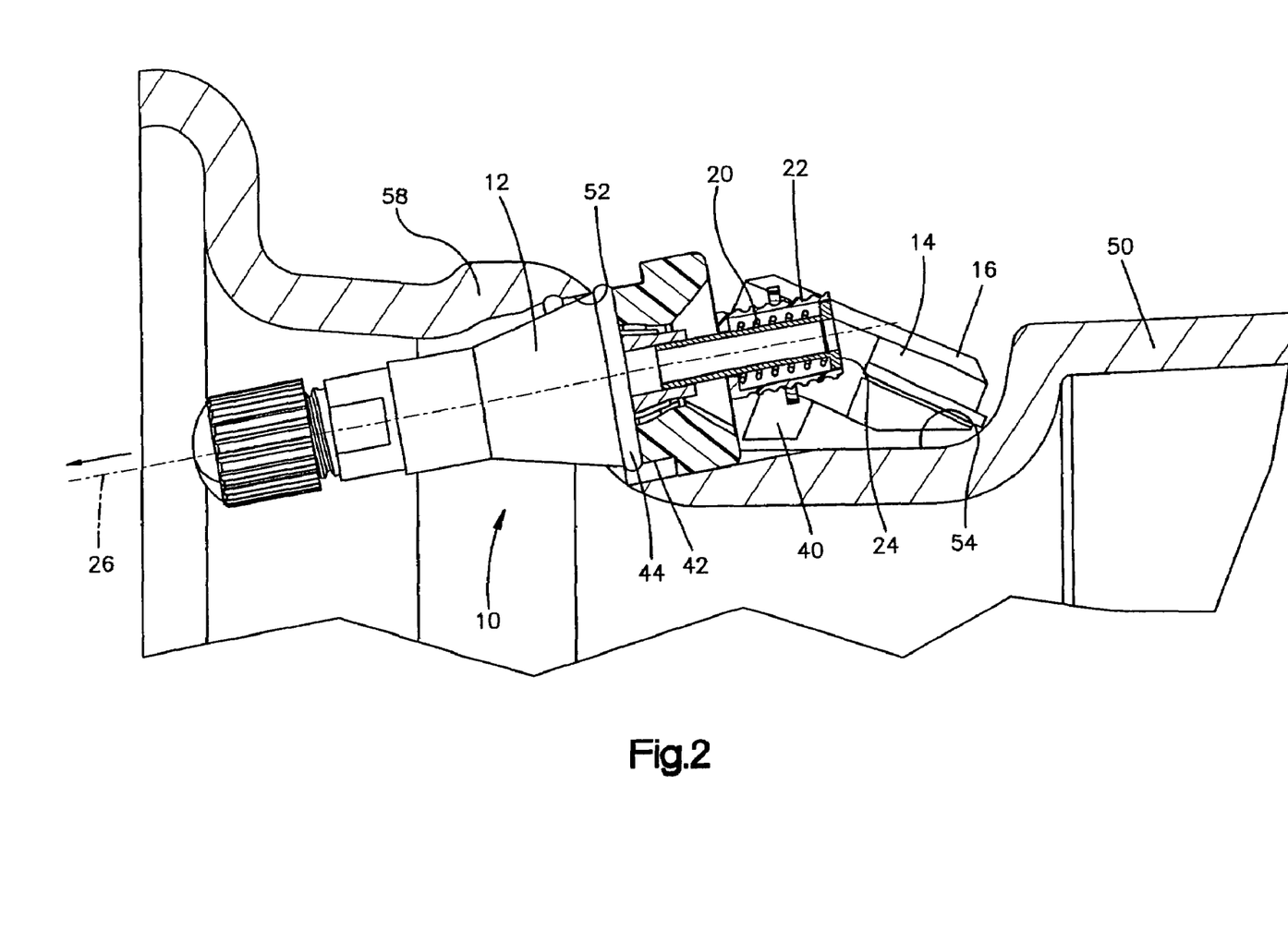
FIGS. 2-4 are side views, partially in section, illustrating the manner in which the tire pressure monitoring apparatus of FIG. 1 is mounted to a vehicle wheel.
Figure 3:
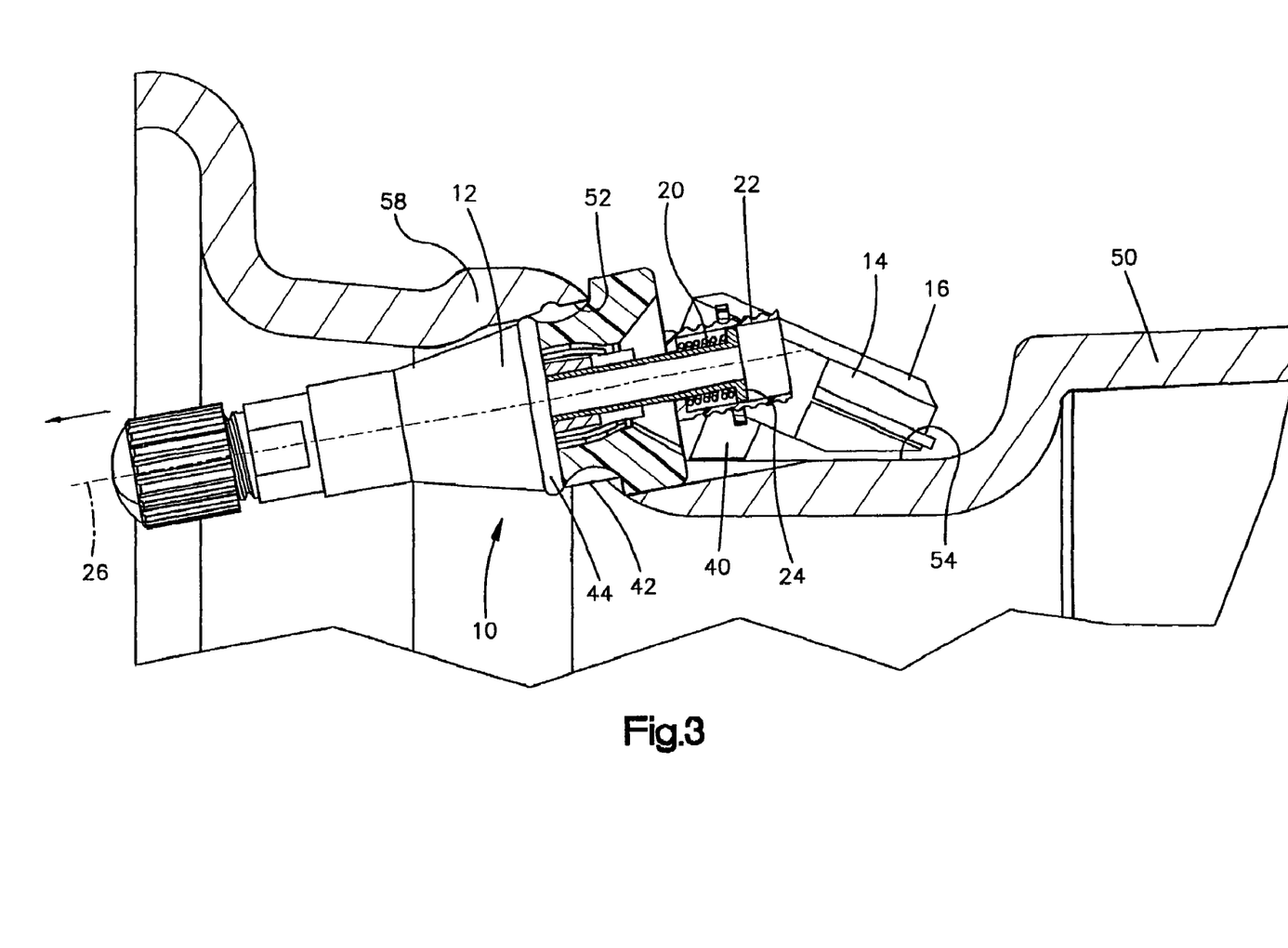
Figure 4:
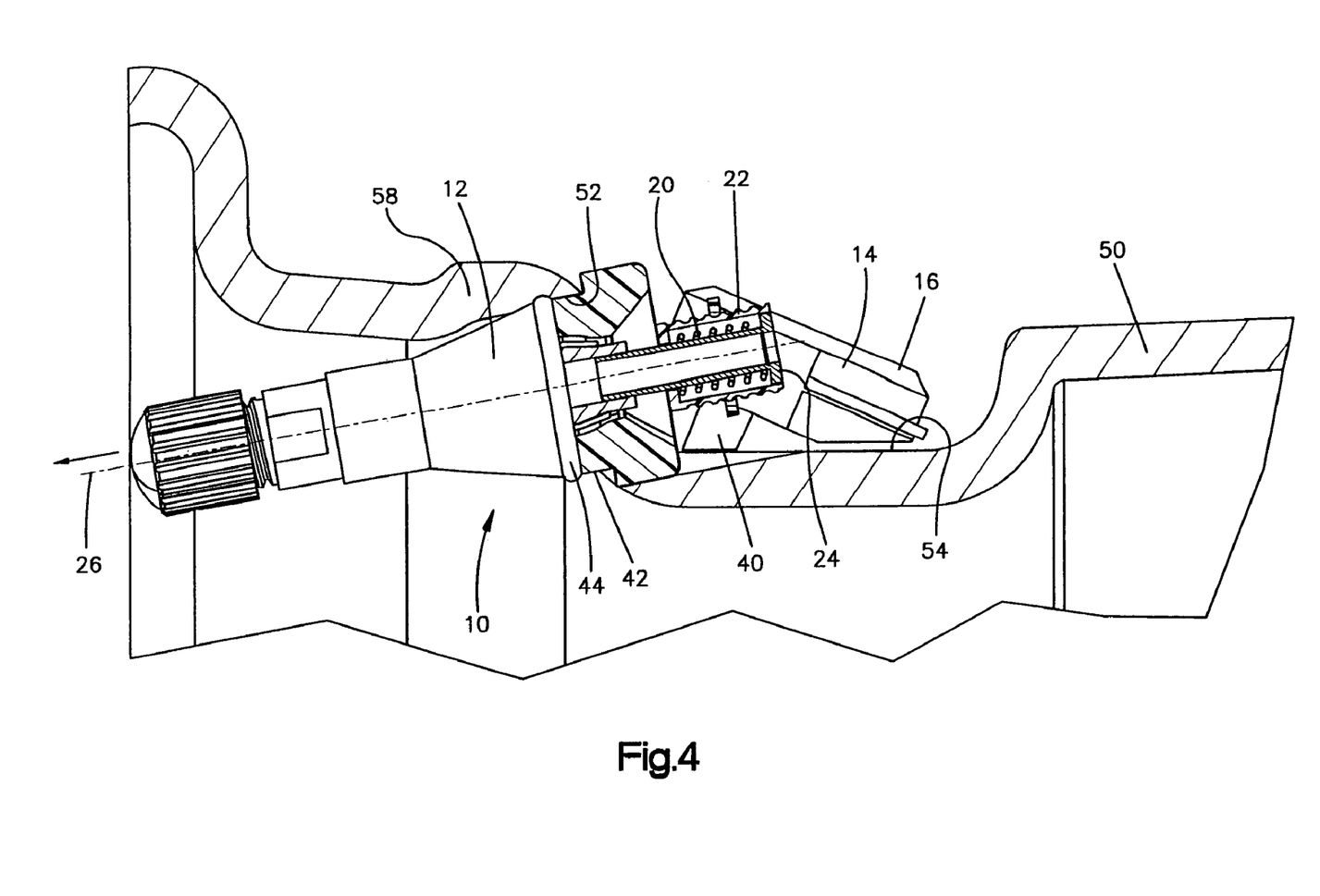
Figure 5:
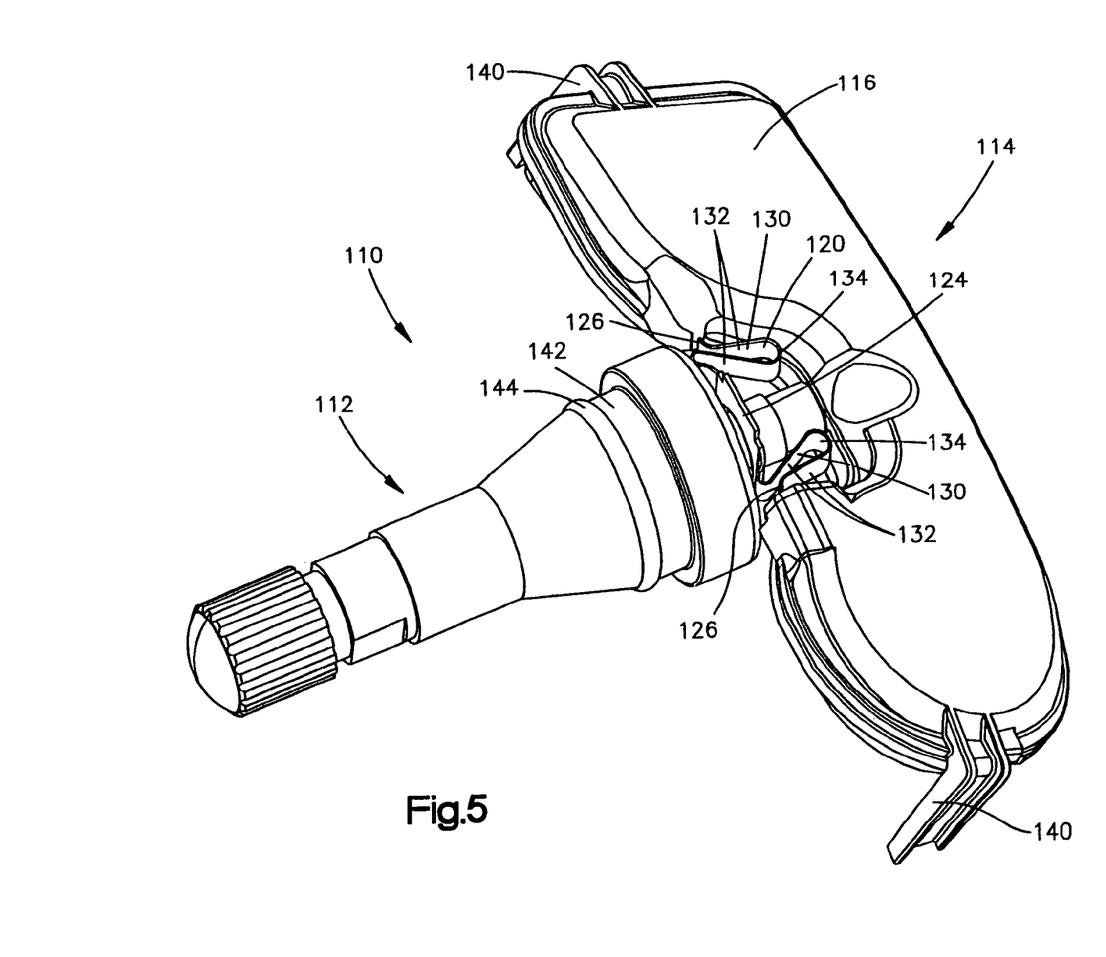
FIG. 5 is a perspective view of a tire pressure monitoring apparatus in accordance with a second embodiment of the present invention.

According to the first embodiment of the present invention, the TPM sensor 10 includes a spring member 20 for helping to support the valve stem 12, or portions thereof, for movement relative to the pressure transducer 14. As shown in FIGS. 2-4, the spring member 20 comprises a helical spring supported in a spring housing portion 22 of the pressure transducer 14. The valve stem 12 includes a plunger member 24 that has a portion positioned in the spring housing 22 and movable relative to the housing along an axis 26.

The plunger member 24 is movable along the axis 26 relative to the spring housing 22 against the bias of the spring member 20. The spring member 20 is constructed of a flexible resilient material, such as steel (e.g., stainless steel). The spring member 20 thus may permit the valve stem 12 and the pressure transducer 14 to move relative to each other through compression or tension. In the embodiment illustrated in FIGS. 1-3, the spring member 20 is configured for compression when the plunger member 24 moves along the axis 26 relative to the spring housing 22. Those skilled in the art, however, will appreciate that the spring member 20 could be configured to be tensioned when the plunger member 24 moves along the axis 26 relative to the spring housing 22.

The configuration of the TPM sensor 10 illustrated in FIGS. 1-4 and described above is a "snap-in" design capable of being mounted to the vehicle wheel 50 without the use of separate fasteners. Referring to FIG. 2, the TPM sensor 10 is secured to the wheel 50 by inserting the valve stem 12 through a stem opening 52 in the wheel. Referring to FIG. 3, as the valve stem 12 is moved through the opening 52, the pressure transducer 14 engages an inner surface 54 of the wheel 50. More particularly, support legs 40 of the pressure transducer 14 engage the inner surface 54 of the wheel 50.

To seat and seal the valve stem 12 in the opening 52, the valve stem is moved through the opening 52 until the annular portion of the wheel 50 that defines the opening snaps into and is received in an annular recess 42 formed by an annular bead 44 of the valve stem 12. To achieve a proper seating and seal between the valve stem 12 and the wheel 50, the valve stem is over-inserted, i.e., moved beyond the position shown in FIG. 2 to the position shown in FIG. 3. As shown in FIG. 3, this causes the valve stem 12 to stretch, deflect, or otherwise deform so that the annular bead 44 extends through the opening 52 and beyond to an extend sufficient to help ensure a proper seal. Thereafter, the valve stem 12 is released, at which time the valve stem snaps back to the seated and sealed position shown in FIG. 4.

According to the present invention, the spring member 20, permitting relative movement between the valve stem 12 and the pressure transducer 14, allows the valve stem 12 to stretch, deflect, or otherwise deform to a degree sufficient to permit the over-insertion of the stem that facilitates the snap fit of the stem onto the wheel. For example, the spring member 20 may permit the valve stem 12 to stretch, deflect, or otherwise deform up to 6 millimeters or more beyond the opening 52.

Once the bead 44 of the valve stem 20 is seated against the wheel 50, the spring member 20 may exert a spring bias that maintains the pressure transducer 14 (e.g., the legs 40) in contact with the inner surface 54 of the wheel 50. The spring member 20 thus may help support the pressure transducer 14 on the wheel 50 and may help prevent shaking, rattling, or other undesirable movement of the pressure transducer relative to the wheel. As shown in FIGS. 2-4, the TPM sensor 10 may be configured such that the valve stem 12 and the pressure transducer 14 extend at an angle with each other, as indicated generally at X in FIG. 4. This angle may help position the pressure transducer 14 relative to the wheel 50 such that the pressure transducer is maintained at a position below a bead hump 58 of the wheel 50. This provides a clearance that helps prevent disturbance of the pressure transducer 14 when tires are mounted to or dismounted from the wheel 50.

Referring to FIGS. 5-8, according to a second embodiment of the present invention, a tire pressure monitoring ("TPM") apparatus or sensor 110 includes a valve stem 112 and a pressure transducer 114 with a housing 116. The TPM sensor 110 is configured to be mounted on a vehicle wheel 150 in a manner described in further detail below. The valve stem 112 includes a valve mechanism (not shown) that allows for selectively inflating or deflating a tire (not shown) mounted on the wheel 150, as known in the art. The pressure transducer 114 is operative to sense the inflation pressure of the tire and provide a signal, indicative of the sensed pressure, to a vehicle mounted apparatus (not shown), such as a controller.

According to the second embodiment of the present invention, the TPM sensor 110 includes a spring member 120 for helping to support the valve stem 112 for movement relative to the pressure transducer 114. The spring member 120 includes a central ring portion 122 that encircles a portion 124 of the valve stem 112, thereby securing the spring member to the valve stem. The spring member 120 has end portions 126 on opposite sides of the ring portion 122 that engage the pressure transducer 114 to secure the spring member to the transducer. Thus, in the embodiment of FIGS. 5-8, the valve stem 112 and pressure transducer 114 are interconnected via the spring member 120.

The spring member 120 also includes spring portions 130 that extend between the ring portion 122 and the end portions 126. Each spring portion 130 includes parallel spring members 132 that are connected to each other, to the ring portion 122, and to the end portions 126 by respective curved portions 134. The spring member 120 and, thus, the spring portions 130, are constructed of a flexible resilient material, such as bronze or steel (e.g., stainless steel). The spring member 120 thus may permit the valve stem 112 and the pressure transducer 114 to move relative to each other through bending or deflection of the spring portions 130.

Figure 6:
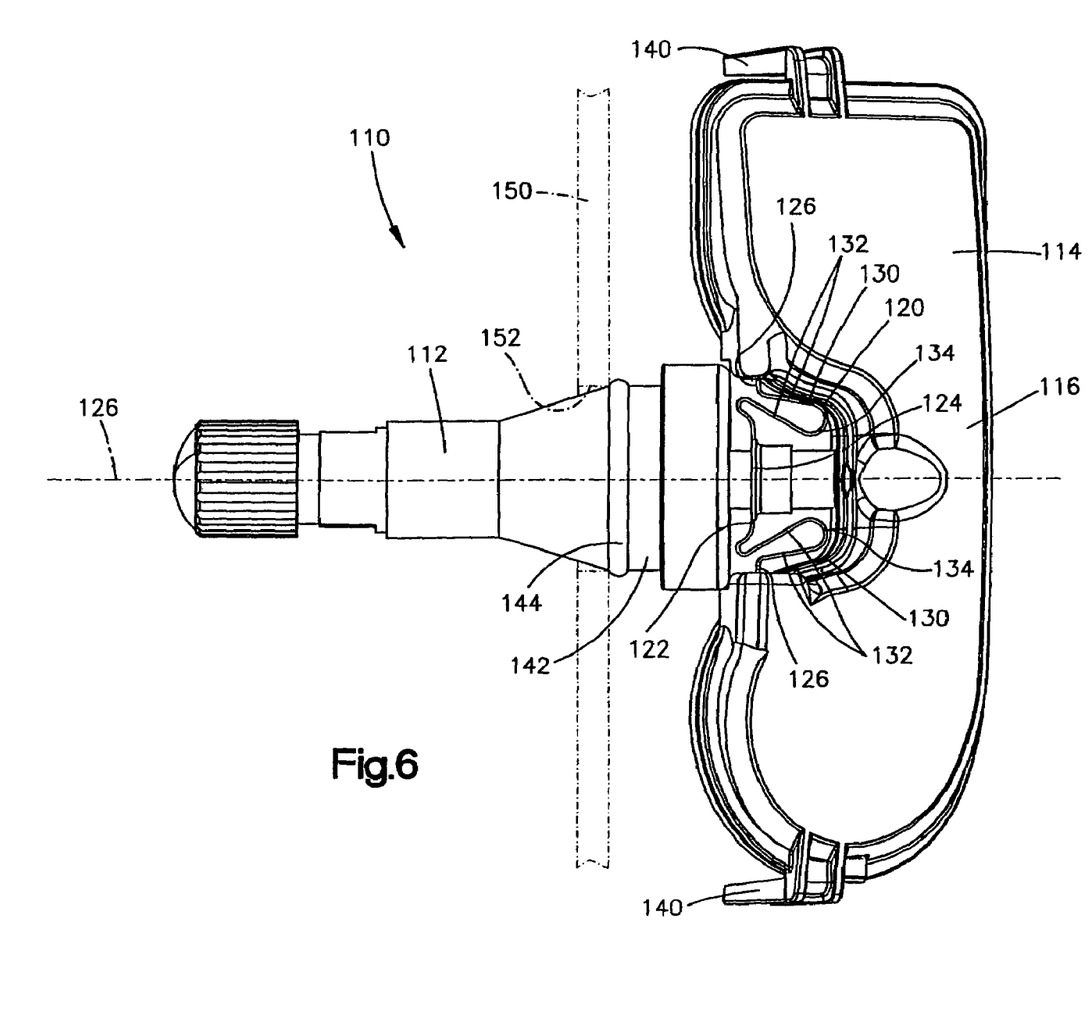
FIGS. 6-8 are side views, partially in section, illustrating the manner in which the tire pressure monitoring apparatus of FIG. 5 is mounted to a vehicle wheel.
Figure 7:
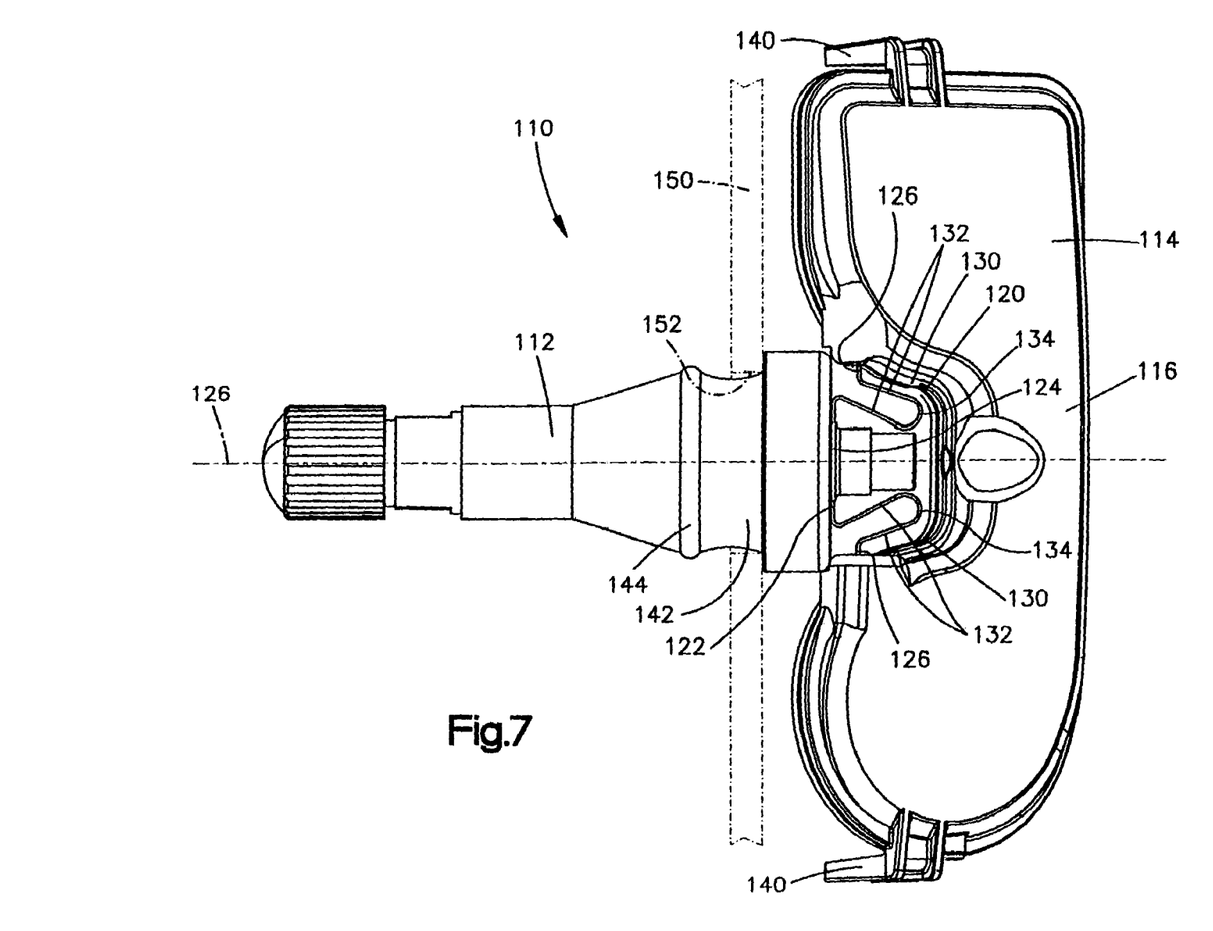
Figure 8:
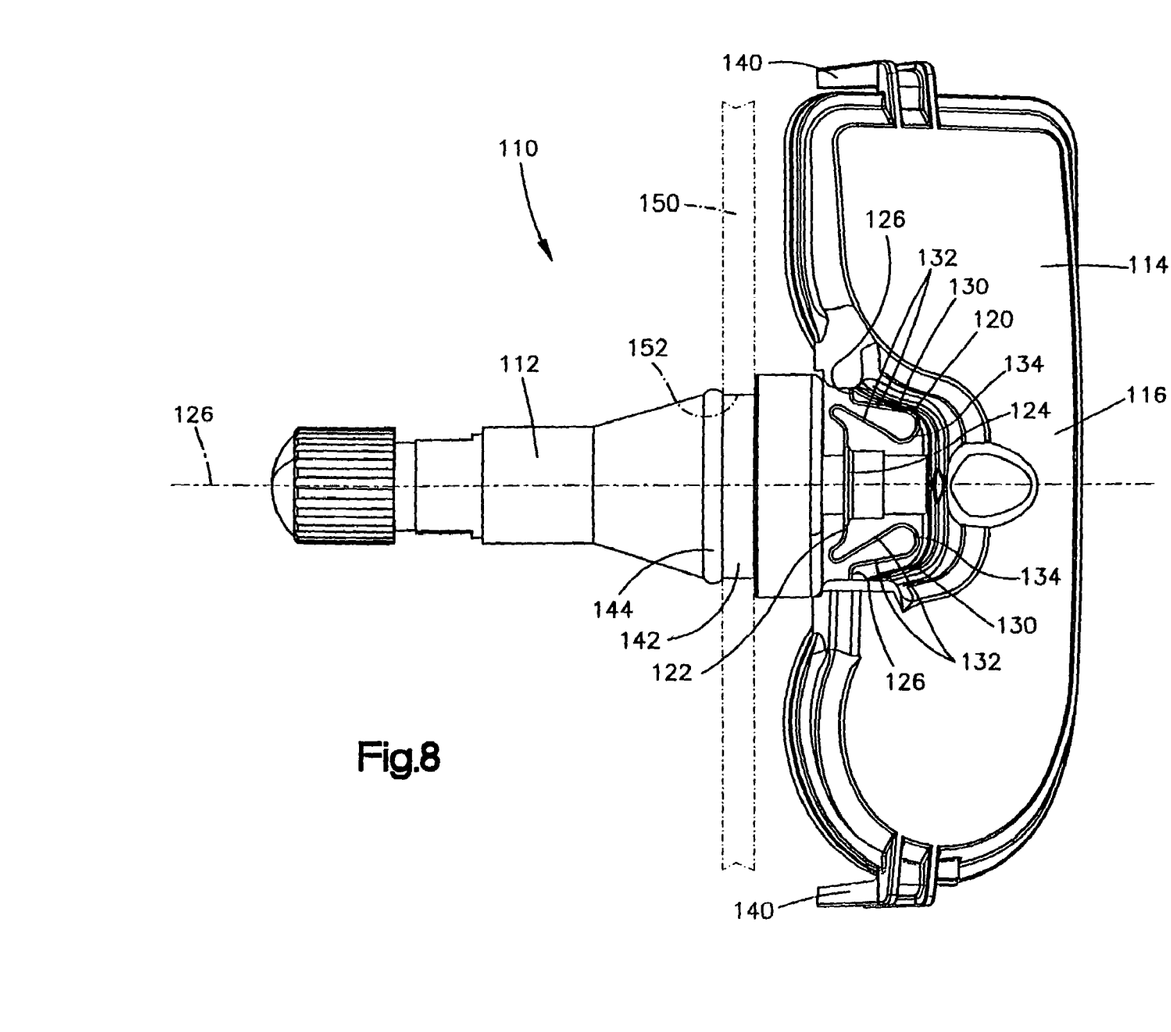

The configuration of the TPM sensor 110 illustrated in FIGS. 5-8 and described above is a "snap-in" design capable of being mounted to the vehicle wheel 150 without the use of separate fasteners. Referring to FIG. 6, the TPM sensor 110 is secured to the wheel 150 by inserting the valve stem 112 through a stem opening 152 in the wheel. Referring to FIG. 7, as the valve stem 112 is moved through the opening 152, the pressure transducer 114 engages an inner surface 154 of the wheel 150. More particularly, support legs 140 of the pressure transducer 114 engage the inner surface 154 of the wheel 150.

To seat and seal the valve stem 112 in the opening 152, the valve stem is moved through the opening 152 until the annular portion of the wheel 150 that defines the opening snaps into and is received in an annular recess 142 formed by an annular bead 144 of the valve stem 112. To achieve a proper seating and seal between the valve stem 112 and the wheel 150, the valve stem is over-inserted, i.e., moved beyond the position shown in FIG. 6 to the position shown in FIG. 7. As shown in FIG. 7, this causes the valve stem 112 to stretch, deflect, or otherwise deform so that the annular bead 144 extends through the opening 152 and beyond to an extend sufficient to help ensure a proper seal. Thereafter, the valve stem 112 is released, at which time the valve stem snaps back to the seated and sealed position shown in FIG. 8.

According to the present invention, the spring member 120, permitting relative movement between the valve stem 112 and the pressure transducer 114, allows the valve stem 112 to stretch, deflect, or otherwise deform to a degree sufficient to permit the over-insertion of the stem that facilitates the snap fit of the stem onto the wheel. For example, the spring member 120 may permit the valve stem 112 to stretch, deflect, or otherwise deform up to 6 millimeters or more beyond the opening 152.

Once the bead 144 of the valve stem 120 is seated against the wheel 150, the spring member 120 may exert a spring bias that maintains the pressure transducer 114 (e.g., the legs 140) in contact with the inner surface 154 of the wheel 150. The spring member 120 thus may help support the pressure transducer 114 on the wheel 150 and may help prevent shaking, rattling, or other undesirable movement of the pressure transducer relative to the wheel. Also, the TPM sensor 110 may be configured such that the valve stem 112 and the pressure transducer 114 extend at an angle with each other in a manner similar to that shown in the embodiment of FIGS. 1-4. This angle may help position the pressure transducer 114 relative to the wheel 150 such that the pressure transducer is maintained at a position below a bead hump (not shown) of the wheel 150. This provides a clearance that helps prevent disturbance of the pressure transducer 114 when tires are mounted to or dismounted from the wheel 150.

From the above description of the invention, those skilled in the art will perceive improvements, changes and modifications. Such improvements, changes and modifications within the skill of the art are intended to be covered by the appended claims.

Having described the invention, the following is claimed:

1. A tire pressure monitoring apparatus comprising:
   a pressure transducer;
   a valve stem having a central axis; and
   a spring member connecting the pressure transducer to the valve stem, the spring member facilitating relative movement between the pressure transducer and the valve stem along the axis.

2. The tire pressure monitoring apparatus recited in claim 1, wherein the valve stem is adapted for insertion in an opening in a vehicle wheel, the pressure transducer comprising portions that engage the vehicle wheel and support the pressure transducer while the valve stem moves relative to the pressure transducer against the bias of the spring member.

3. The tire pressure monitoring apparatus recited in claim 2, wherein the portions of the pressure transducer that engage the vehicle wheel comprise leg portions that project from the pressure transducer.

4. The tire pressure monitoring apparatus received in claim 2, wherein the valve stern comprises a portion that seats against the opening in the vehicle wheel when the valve stem moves relative to the pressure transducer against the bias of the spring member.

5. The tire pressure monitoring apparatus recited in claim 1, wherein the relative movement between the valve stem and the pressure transducer facilitated by the spring member permits over-insertion of the valve stem through an opening in a vehicle wheel to help seat the valve stem in the opening.

6. The tire pressure monitoring apparatus recited in claim 5, wherein the over-insertion of the valve stem allows an annular bead of the valve stem to extend through the opening to an extent sufficient to ensure proper seating of the valve stem.

7. The tire pressure monitoring apparatus recited in claim 1, wherein the spring member biases the pressure transducer against the vehicle wheel to help support the pressure transducer on the wheel.

8. The tire pressure monitoring apparatus recited in claim 1, wherein the valve stem and the pressure transducer extend at an angle with each other, the angle being selected to position the pressure transducer below a bead hump of a vehicle wheel when the apparatus is mounted to the wheel.

9. The tire pressure monitoring apparatus recited in claim 1, wherein the spring member comprises a helical spring.

10. The tire pressure monitoring apparatus recited in claim 1, wherein the spring member comprises a leaf spring.

11. The tire pressure monitoring apparatus recited in claim 10, wherein the leaf spring comprises:
   a central portion connectable with the valve stem;
   first and second end portions connectable with the pressure transducer; and
   first and second spring portions that extend between the end portions and the central portion, the spring portions being deflectable to permit relative movement between the valve stem and the pressure transducer.

* * * * *